United States Patent
Attra

(10) Patent No.: US 6,425,419 B1
(45) Date of Patent: Jul. 30, 2002

(54) FLEXIBLE AIR DUCTING

(76) Inventor: Sharon L. Attra, 510 Avenue of Oaks, Houston, TX (US) 77009

( * ) Notice: Subject to any disclaimer, the term of this patent is extended or adjusted under 35 U.S.C. 154(b) by 0 days.

(21) Appl. No.: 09/934,135

(22) Filed: Aug. 22, 2001

(51) Int. Cl.[7] .................................................. F16L 9/14
(52) U.S. Cl. ...................... 138/149; 138/132; 138/133; 138/141; 138/144
(58) Field of Search ............................... 138/132, 133, 138/134, 129, 137, 140, 141, 144, 154

(56) References Cited

U.S. PATENT DOCUMENTS

| | | | | |
|---|---|---|---|---|
| 992,516 A | * | 5/1911 | Mulconroy et al. .......... | 138/122 |
| 2,862,598 A | * | 11/1958 | Carder, Jr. et al. .......... | 138/133 |
| 2,936,792 A | * | 5/1960 | MacCracken et al. ....... | 138/131 |
| 3,543,805 A | * | 12/1970 | Matthews ..................... | 138/133 |
| 3,548,884 A | * | 12/1970 | Ambrose ...................... | 138/129 |
| 3,916,953 A | * | 11/1975 | Nagayoshi et al. .......... | 138/129 |
| 4,023,589 A | * | 5/1977 | Rejeski ......................... | 138/149 |
| 4,258,755 A | * | 3/1981 | Higbee ......................... | 138/104 |
| 4,417,603 A | * | 11/1983 | Argy ............................. | 138/104 |
| 4,735,235 A | * | 4/1988 | Anderson et al. ............ | 138/109 |
| 5,795,634 A | * | 8/1998 | Fukui ............................ | 138/122 |
| 5,806,567 A | * | 9/1998 | Fukui et al. .................. | 138/132 |
| 6,179,009 B1 | * | 1/2001 | Fukui ............................ | 138/149 |

* cited by examiner

Primary Examiner—Patrick Brinson
(74) Attorney, Agent, or Firm—Bill B. Berryhill

(57) ABSTRACT

Composite flexible air ducting comprising an elongated inner lining of plastic reinforced by a spirally wound coil member providing an elongated continuous air passage; a layer of natural fiber insulation surrounding the inner lining and an outer sheath surrounding the layer of natural fiber insulation. The outer sheath and the layer of fiber insulation are bonded to each other by a layer of adhesive having substantial thermal insulating properties.

14 Claims, 1 Drawing Sheet

FLEXIBLE AIR DUCTING

BACKGROUND OF THE INVENTION

1. Field of the Invention

The present invention pertains to flexible air ducting. More specifically, the present invention pertains to flexible ducting utilized for conveying air in heating and air conditioning systems.

2. Description of the Prior Art

Air conditioning systems for heating and/or cooling air are typically provided with cooling and heating equipment by which ambient air is heated or cooled depending upon the particular need. The heated or cooled air is then forced by an air handler of some type through air ducting for distribution to areas where needed, e.g. the rooms of a residence or building.

In the past, such ducting typically comprised passageways formed by sheet metal wrapped or covered with insulation. The use of sheet metal required construction to specific dimensions for moving the air from one point to another. Because of obstacles and space restrictions encountered, such construction could be very expensive.

In more recent times, flexible ducting has been developed to distribute air from an air handler to the areas needed. Typical flexible air ducting provides an inner liner of polyethylene or other plastic reinforced by a spirally wound coil member to form a passage through which air may flow. The plastic liner is basically a protective layer and the metal coil prevents the passage from collapsing and blocking air flow. Surrounding the inner liner is a layer, typically one inch to one and one-half inch, of fiberglass batting insulation material which provides resistance to heat transfer (R-value) between the conditioned air passing through the ducting and the unconditioned or ambient air surrounding the ducting. An outer layer of thin black polyethylene or thin reflexive sheathing material surrounds the layer of fiberglass batting material for the protection thereof. Flexible ducting is much more versatile than sheet metal ducts of the prior art and can be utilized with much less concern for obstacles, space limitations and specific dimensions. Flexible air ducting can be made in relatively long lengths. It may be easily cut with knives, scissors, and wire cutters to desired lengths and reconnected by clamps and duct tape.

It is, of course, important that ducting be insulated to prevent heat transfer between the air flowing through the ducting and the ambient air surrounding the ducting. That is a primary reason for the fiberglass batting layer which surrounds the inner liner of ducting of prior art. There are some significant safety and health concerns with fiberglass which has been identified as a possible carcinogenic. OSHA requires workers handling fiberglass insulation materials to wear protective clothing to prevent skin irritation. Workers are also required to wear respirator masks to keep from breathing fiberglass particles which break loose during handling. Workers must take care in cleaning up after work and special care is required in cleaning clothing worn during work. Since fiberglass batting insulation is made from tiny fibers of ground up glass held together with a binding substance, such concerns are warranted.

It is also very important that fiberglass particles not enter the air being distributed through the ducting. Although there is an inner liner of plastic and spiraled wire in air ducting of the prior art, the plastic may be punctured or torn relatively easily by technicians installing or servicing an air conditioning system. If, at some later date, a home owner or building owner has the ducting cleaned, cleaning brushes may also puncture the inner plastic liner. Of course, if the inner plastic liner is punctured, loose fibers of glass from the fiberglass batting insulation may be moved with air through the ducting and delivered or distributed into air breathed by home or building occupants. This, of course, may be hazardous to the occupants thereof. If a home or building is subsequently altered or demolished, disposal of fiberglass ducting may create contamination and ecological problems.

Better materials and composition of air ducting are needed. Compositions which would provide greater health and safety without sacrificing the flexible and versatile characteristics of flexible air ducting should be well accepted.

SUMMARY OF THE PRESENT INVENTION

The present invention provides composite flexible air ducting which, as in the prior art, is provided with an elongated inner lining of plastic reinforced by a spirally wound coil member to provide an elongated continuous air passage. A layer of insulation surrounds the inner lining to provide thermal insulation of the air passage from ambient air and an outer sheath surrounds the layer of insulation to provide protection thereto. However, the layer of insulation provided in the flexible air ducting of the present invention is cotton batting or other natural fibrous materials which provide greater insulation and are much less hazardous than fiberglass batting of the prior art.

In addition, the outer protective sheath and the layer of natural fiber insulation of the present invention are uniquely bonded to each other by a layer of adhesive which, after application and curing, provides substantial thermal insulating properties. The preferred adhesive is a compound material of resins and ceramics which, when cured and hardened, has a substantial R-factor.

Thus, the present invention provides flexible air ducting with flexible and versatile characteristics of the prior art but with additional and improved characteristics. The natural fiber insulation eliminates the heath risk associated with fiberglass insulation of the prior art. Technicians manufacturing, installing or servicing the ducting are not required to wear protective clothing or respirator masks. No special clothing or cleaning of clothing and workers is required. Furthermore, the air ducting of the present invention provides substantially greater insulating qualities resulting in more efficient air handling systems, lower energy use and lower energy cost. It's manufacture also requires less energy. Many other objects and advantages of the invention will be understood from reading the specification which follows in conjunction with the accompanying drawings.

DESCRIPTION OF A PREFERRED EMBODIMENT OF THE INVENTION

Figure 1:
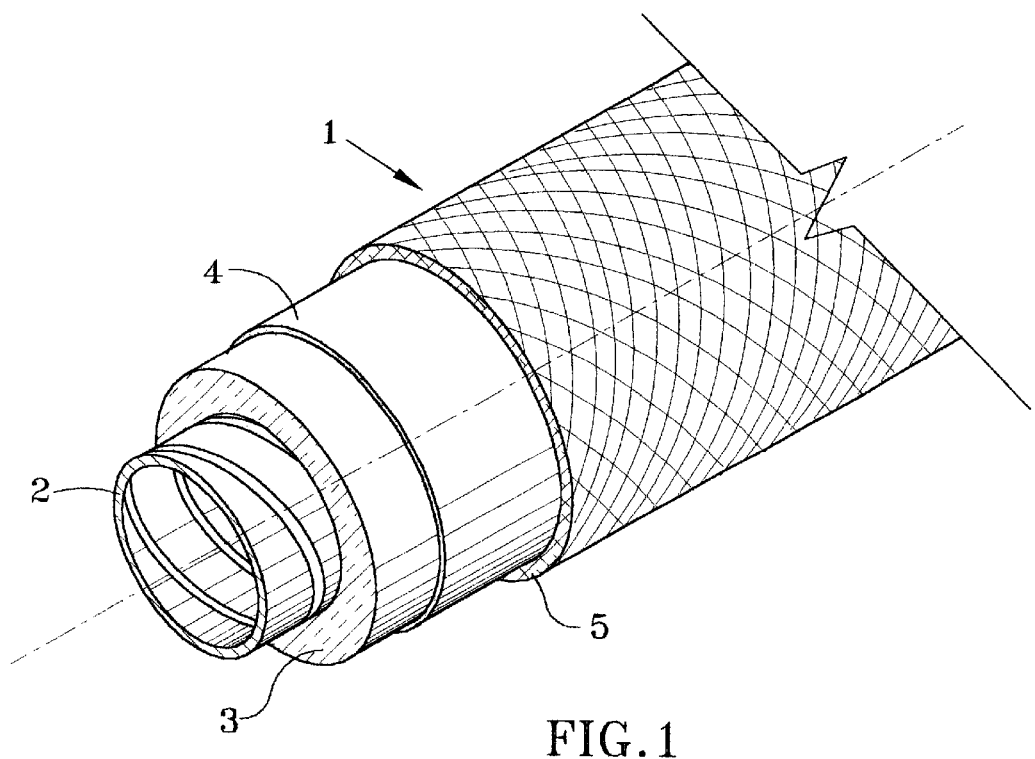
FIG. 1 is an isometric view of one end of a section of flexible air ducting, according to a preferred embodiment of the invention, showing various layers stripped away from the end for a clearer understanding thereof.
Figure 2:
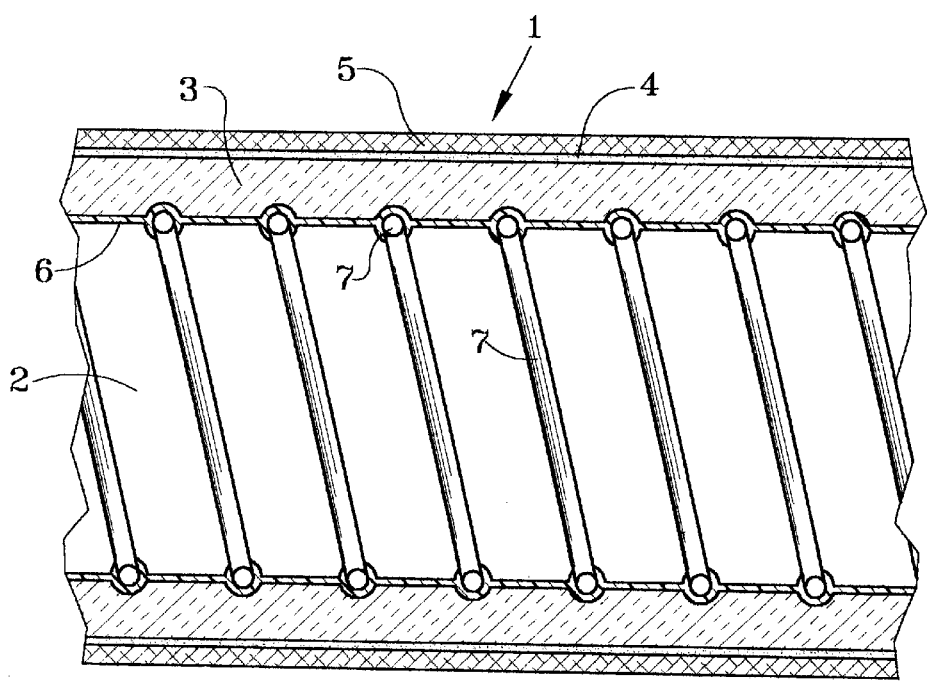
FIG. 2 is a cross-sectional view of a section of flexible air ducting, such as that shown in FIG. 1 and according to a preferred embodiment of the invention.

Referring to both FIGS. 1 and 2, there is shown a section of flexible air ducting 1 according to a preferred embodiment of the invention. The ducting 1 comprises an elongated inner liner 2 reinforced by a spirally wound coil member 7 to provide an elongated continuous air passage. Actually, the coil member 7 lies between two thin sheets of plastic which may be heated and bonded together as a composite. The liner 2 is thus formed of relatively thin polyethylene 6 or other plastic material to provide protection from outer layers of the air ducting 1. The spirally wound coil member 7 would typically be a metal material and is primarily for preventing collapse of the ducting 1 which would block flow of air therethrough. The coil member 7 allows the air ducting 1 to be bent or directed around obstacles and through limited spaces without collapsing and without requiring predetermined dimensional specifications therefor.

Surrounding the inner liner 2 is a layer of natural fibrous material 3 which takes the place of the typical fiberglass batting material of prior art. The preferred material is cotton. However, any suitable natural fibrous plant material may be used. Some examples are: hemp, flax, cotton, kapok, jute, wood, and combinations of such materials. The cotton batting (or other natural fibers) 3 may be conveniently manufactured from recycled materials and may be treated with borates to provide fire retardant and flame resistant properties. Borates are safe for humans and also resist the development of fungi. In addition, such natural fiber batting insulation has greater insulating properties than fiberglass batting insulation, e.g. an R-value of 3.6 per inch for cotton as compared to fiberglass which has an R-value 2.5 per inch. Note: R-value is a numeric value, in units of $hr/Btu-ft^2$-degree F, which defines the resistance to heat transfer.

The air ducting 1 of the present invention, like that of the prior art, also comprises an outer or external sheath 5 which surrounds and protects other components of the air ducting 1 and is formed from black polyethylene, or other plastic, or a reflexive aluminum sheathing.

One of the most important and unique features of the air ducting of the present invention is the provision of a thin layer of special adhesive 4 between the layer of insulation 3 and the external sheathing 5. This adhesive 4 binds the external sheathing 5 to the insulation 3. The adhesive 4 is a radiant adhesive/paint of special composition and insulating characteristics. There are a few companies which manufacture these types of materials. One particularly suitable material for this purpose is manufactured by Superior Products under the trademark THERMSEAL.

THERMSEAL is a combination of high performance acrylic resins and water. This material may be actually painted, by spraying or brushing, on the outer surface of the insulation 3 prior to being wrapped with the external sheathing 5. It cures out completely within two weeks to an extremely tough, durable, non-yellowing, water-resisting coating which provides flexibility and ultra-violent stability. The specially formulated THERMSEAL is designed with three separate ceramics, two reflective, with one deflecting radiant heat and the other working to reduce emissivity or reduce the heat build up on the surface of the coating. The third ceramic particle acts as a microscopic dead air space between the coating surface and the substrate to stop heat and/or cold conduction through the coating film. In testing, THERMSEAL, applied wet with a 14 mil coating and drying to 7 mils, out performed six to eight inches of fiberglass batting insulation. The adhesive 4 is, of course, applied as indicated, as a brushed on or sprayed layer of paint. Then the outer layer of sheathing is applied thereto. The adhesive then binds the layer of insulation 3 to the outer external sheath 5. Most importantly, it provides superior insulating properties having an R-factor of 10–30.

Thus, the air ducting of the present invention which comprises natural fiber batting insulation such as cotton 3 and the unique thermal insulating adhesive 4 is much superior to the fiberglass batting flexible ducting of the prior art. The natural fiber batting insulation has a higher R-value than fiberglass batting and is much safer eliminating the hazards of fiberglass and eliminating the necessity for technicians to wear protective clothing and respirator masks, simplifying manufacturing and installation procedures and eliminating other environmental problems. The additional insulating and protective properties of the special adhesive 4 greatly enhances the durability and the thermal insulating characteristics of the ducting. The air ducting of the present invention is much more energy efficient, resulting in lower energy costs for air conditioning systems utilizing such ducting.

While a single preferred embodiment of the invention has been described herein, many variations thereof will be apparent to those skilled in the art without departing from the spirit of the invention. Accordingly, it is intended that the scope of the invention be limited only by the claims which follow.

What is claimed is:

1. Composite flexible air ducting comprising:
   an elongated internal liner reinforced by a spirally wound coil member to form a continuous bore for said ducting;
   a layer of natural fibrous material surrounding said internal liner to provide thermal insulation between said bore and ambient air surrounding said ducting;
   an external sheath surrounding said layer of fibrous material; and
   a thin layer of adhesive between said layer of fibrous material and said external sheath binding said sheath to said layer of fibrous material.

2. Composite air ducting as set forth in claim 1 in which said layer of natural fibrous material comprises one or more of the following plant materials: cotton, flax, hemp, kapok, jute and wood.

3. Composite flexible air ducting as set forth in claim 1 in which said layer of natural fibrous material is treated to provide fire retardant and flame resistant properties.

4. Composite flexible air ducting as set forth in claim 3 in which said layer of fibrous material is treated with borates to provide said fire retardant and flame resistant properties.

5. Composite flexible air ducting as set forth in claim 1 in which said layer of adhesive is a compound material of resins and ceramics which after application and curing provides substantial thermal insulating properties.

6. Composite flexible air ducting as set forth in claim 5 in which said layer of adhesive is a compound material comprising a blend of two or more resins and two or more ceramics.

7. Composite flexible air ducting as set forth in claim 5 in which said layer of adhesive has an R-factor between 10 and 30.

8. Composite flexible air ducting as set forth in claim 1 in which said internal liner comprises plastic reinforced by a spirally wound metallic coil member and said external sheathing is of a heat reflective material.

9. Composite flexible air ducting comprising:
   an elongated inner lining of plastic reinforced by a spirally wound coil member to provide an elongated continuous air passage;
   a layer of natural fiber insulation surrounding said inner lining to provide thermal insulation of said air passage from ambient air surrounding said ducting; and
   an outer sheath surrounding said layer of natural fiber insulation to provide protection thereto.

10. Composite flexible air ducting as set forth in claim 9 in which said outer sheath and said layer of natural fiber insulation are bonded to each other by a layer of adhesive having substantial thermal insulating properties.

11. Composite flexible air ducting as set forth in claim 10 in which said layer of adhesive comprises a compound of resins and ceramics.

12. Composite flexible air ducting as set forth in claim 11 in which said layer of adhesive comprises a compound material of two or more resins and one or more ceramics.

13. Composite flexible air ducting as set forth in claim 10 in which said layer of adhesive has an R-factor greater than 10.

14. Composite flexible air ducting as set forth in claim 10 in which said natural fiber insulation comprises one or more of the following plant materials: cotton, flax, hemp, kapok, jute, and wood.

* * * * *